(12) United States Patent
Balk

(10) Patent No.: US 8,678,174 B2
(45) Date of Patent: Mar. 25, 2014

(54) METHOD AND DEVICE FOR BUFFERING PRODUCTS

(75) Inventor: Wouter Balk, JK Baambrugge (NL)

(73) Assignee: Ambaflex International B.V., Zwaag (NL)

( * ) Notice: Subject to any disclaimer, the term of this patent is extended or adjusted under 35 U.S.C. 154(b) by 1341 days.

(21) Appl. No.: 11/587,269

(22) PCT Filed: Apr. 18, 2005

(86) PCT No.: PCT/NL2005/000283
§ 371 (c)(1),
(2), (4) Date: Oct. 23, 2006

(87) PCT Pub. No.: WO2005/102877
PCT Pub. Date: Nov. 3, 2005

(65) Prior Publication Data
US 2007/0221477 A1 Sep. 27, 2007

(30) Foreign Application Priority Data

Apr. 21, 2004 (NL) .................................... 1025991

(51) Int. Cl.
*B65G 21/18* (2006.01)
*B65G 47/51* (2006.01)
(52) U.S. Cl.
USPC ............................ 198/602; 198/594; 198/812
(58) Field of Classification Search
USPC ................................................ 198/756, 778
See application file for complete search history.

(56) References Cited

U.S. PATENT DOCUMENTS

| 3,523,853 | A | * | 8/1970 | Thomas ........................ 156/354 |
| 3,866,739 | A | * | 2/1975 | Sikorski ........................ 198/453 |
| 4,262,797 | A | * | 4/1981 | Schuricht et al. ............. 198/756 |
| 4,351,429 | A | * | 9/1982 | Garvey ...................... 198/690.2 |
| 5,070,999 | A | * | 12/1991 | Layne et al. .................. 198/778 |
| 5,139,150 | A | * | 8/1992 | Fuller et al. .................. 209/576 |
| 5,259,302 | A | * | 11/1993 | Chen .............................. 99/405 |
| 5,413,213 | A |   | 5/1995 | Golz et al. |

(Continued)

FOREIGN PATENT DOCUMENTS

EP           1 389 595        2/2004

OTHER PUBLICATIONS

International Search Report issued Aug. 11, 2005 in International (PCT) Application No. PCT/NL2005/000283.

(Continued)

*Primary Examiner* — Kavel Singh
(74) *Attorney, Agent, or Firm* — Wenderoth, Lind & Ponack, L.L.P.

(57) ABSTRACT

A method for buffering products, such as bottles, cans and pots, wherein the products are carried upwards on a moving, inclined first conveying surface at a first flow rate. The products on the first conveying surface can accumulate against a guide member at the upper end of the first conveying surface, after which the products are guided from the guide member onto a second conveying surface, on which they are conveyed onwards at a second flow rate. The first conveying surface is disposed at such an angle and is provided with such a surface condition that the dragging force exerted on the products from the first conveying surface is just a little greater than the force of gravity being exerted on the products in the direction along the conveying surface. As a result, the products can be buffered in a simple manner, while the products exert only little pressure on each other.

22 Claims, 2 Drawing Sheets

(56) References Cited

U.S. PATENT DOCUMENTS

| | | | |
|---|---|---|---|
| 5,490,589 A | 2/1996 | Golz et al. | |
| 5,738,202 A * | 4/1998 | Ydoate et al. | 198/460.1 |
| 6,152,291 A * | 11/2000 | Steeber et al. | 198/594 |
| 6,260,688 B1 | 7/2001 | Steeber et al. | |
| 6,394,261 B1 * | 5/2002 | DeGennaro | 198/815 |
| 6,419,078 B1 * | 7/2002 | Leathers | 198/500 |
| 6,523,677 B1 * | 2/2003 | DeGennaro et al. | 198/778 |
| 6,564,930 B1 * | 5/2003 | Colding-Kristensen et al. | 198/778 |
| 2001/0054540 A1 | 12/2001 | Steeber et al. | |
| 2002/0157921 A1 | 10/2002 | Steeber et al. | |
| 2003/0111319 A1 | 6/2003 | Steeber et al. | |

OTHER PUBLICATIONS

Written Opinion of the International Search Report issued Aug. 11, 2005 in International (PCT) Application No. PCT/NL2005/000283.

* cited by examiner

METHOD AND DEVICE FOR BUFFERING PRODUCTS

BACKGROUND OF THE INVENTION

1. Field of the Invention

The present invention relates to a method of buffering products, in particular substantially cylindrical containers, such as bottles, cans and pots. The invention also relates to a device for carrying out this method.

2. Description of the Related Art

In many cases it is necessary to buffer products in a treatment line for products. For example, in a bottling plant, bottles must be filled, sealed, labelled and packaged. The handling rate may be temporarily higher or lower at different locations in the line, making it necessary to buffer the bottles between two treatment locations in order to prevent having to adapt the entire treatment line temporarily.

Various methods of buffering products are known. One known method employs a conveyor comprising a forwardly moving conveyor belt and a backwardly moving conveyor belt, as well as a transfer device, whose location on the conveyor depends on the relative speeds of the two conveyor belts. In this way a larger or smaller part of the conveyor is occupied by the products, depending on the required buffering capacity.

Although this method is satisfactory per se, it requires a complex apparatus to ensure a smooth operation.

SUMMARY OF THE INVENTION

The object of the invention is to provide a comparatively simple method for buffering products.

In order to accomplish that object, the invention provides a method for buffering products, in particular cylindrical containers, such as bottles, cans and pots, wherein the products are carried upwards on a moving, inclined first conveying surface at a first flow rate and the products on said first conveying surface can accumulate against a guide member at the upper end, after which the products are guided from the guide member onto a second conveying surface, on which they are conveyed onwards at a second flow rate, wherein the first conveying surface is disposed at such an angle and is provided with such a surface condition that the dragging force exerted on the products from the first conveying surface is slightly greater than the force of gravity being exerted on the products in the direction along the conveying surface.

In principle, this method can be self-regulating, because the first conveying surface is automatically filled with or cleared of products, depending on the rate at which the products are supplied and discharged. A suitable selection of the angle of inclination of the conveying surface and of the surface condition thereof makes it possible to control the method so that the products are just carried upwards on the first conveying surface. The consequence of this is that the pressure on the accumulating products can be kept low because the first conveying surface can easily move under the products and newly arriving products are pressed against the accumulated products with only little force. By selecting a specific lubrication, for example, it is possible to adjust such a coefficient of friction between the first conveying surface and the products that are carried up-wards with the desired dragging force on the first conveying surface.

The invention furthermore relates to a device for carrying out this method.

To obtain a large buffering capacity, the width of the first conveying surface will preferably be greater than the width of the second conveying surface, and the conveying surfaces will be laterally bounded by guides.

In this way a large number of products can accumulate on the first conveying surface, but the products will leave the buffering device one by one via the second conveying surface, so that the products will be supplied for a new treatment at an even rate. To form a compact device, it is advantageous if the guide member extends at an angle with respect to the first conveying surface, being arranged for deflecting and preferably reversing the flow of products, wherein said first and second conveying surfaces are preferably formed on endless conveying elements that are driven in opposite directions, which are at least partially led along identical paths, which are preferably helical in shape.

In this way the device occupies a minimum amount of floor space, and consequently the buffering area is extended in vertical direction, where usually sufficient space is available.

Preferably, the device is provided with a lubricating device for lubricating the first conveying surface. Using this lubricating device, the coefficient of friction between the first conveying surface and the products to be buffered can be adjusted so that the products are correctly conveyed and accumulated by the device.

The invention will be explained in more detail hereinafter with reference to the drawings, which schematically show an embodiment of the invention.

DETAILED DESCRIPTION OF THE INVENTION

Figure 1:
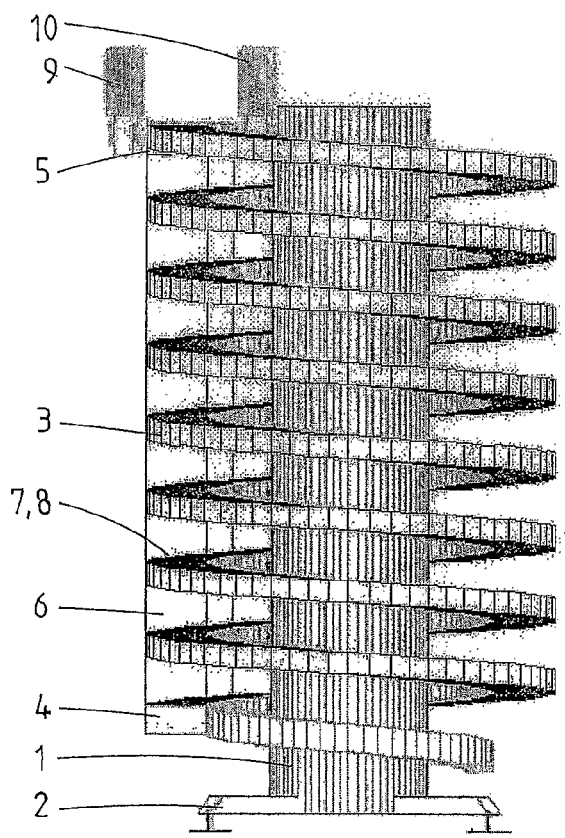
FIG. 1 is a schematic side view of an embodiment of the device for buffering products according to the invention.
Figure 2:
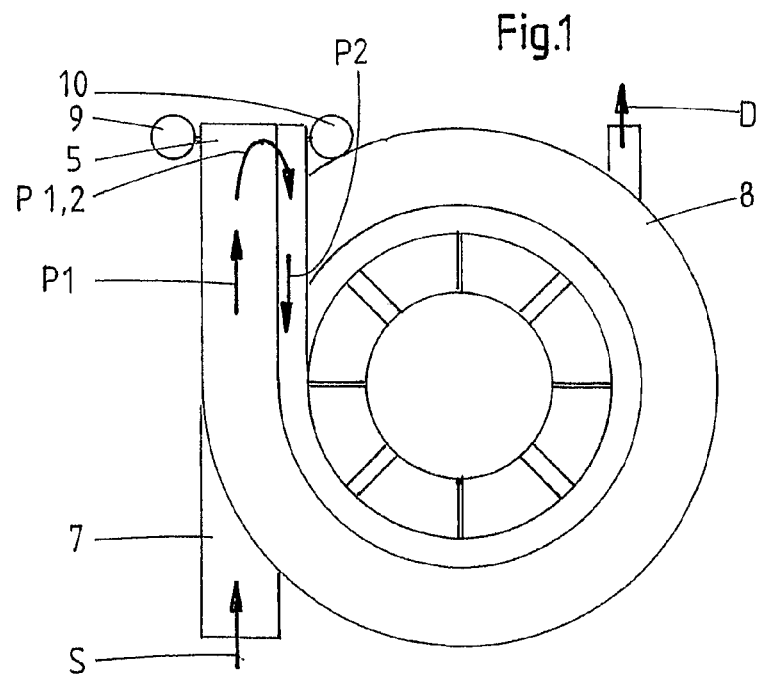
FIG. 2 is a top plan view of the device of FIG. 1.

The drawings show a device for buffering products. Said buffering takes place in a processing line in which the products are subjected to various processing or treatment steps at various locations, and in which temporary differences in the processing rates at said locations must be set off. The products may consist of containers, for example, in particular substantially cylindrical containers such as bottles, cans, pots and the like. In most cases the processing line consist of a filling line for filling the containers in question, such as a bottling line for filling the bottles with a beverage. The buffering device may be arranged between a depalletising station and a washing and/or filling station, between the filling station and a labelling station and between the labelling station and a packaging station, for examples. Also other fields of application are conceivable, of course.

The device as shown comprises a frame, in this embodiment having a central column 1 with a base 3 and a helical guide chute 3 extending around the column and being attached thereto. Also, all kinds of other frame constructions are conceivable, of course. An end roller 4, 5 is disposed at the upper end and the lower end of the guide chute, and a return chute 6 of the frame extends between said ends of the helical guide chute 3. With the device according to the invention, the guide chute 3 and the return chute 6 support a first conveyor belt 7 and a second conveyor belt 8. The conveying part and the return part of the two conveyor belts 7, 8 move along different paths. It is also conceivable to use an embodiment in which the return part is led back along the bottom side of the guide chute 3 for the conveying part.

In the illustrated embodiment, the helical chute 3 comprises eight windings, but it is possible to use a larger or a smaller number, depending on the application in question. By using guide rollers on the conveyor belts 7, 8, for example, the conveyor belts can be driven over a large number of windings without any driving problems. The two conveyor belts 7, 8 each have their own driving motor 9, 10, which motors are disposed near the upper end roller 5, in this case, and which engage the associated conveyor belt 7, 8. The two conveyor belts 7, 8 can be driven independently of each other, in opposite directions in the present case, i.e. the products are conveyed upwards over the conveying surface of the first conveyor belt 7 as indicated by the arrow $P_1$, and downwards again over the conveying surface of the second conveyor belt 8 (see arrow $P_2$). At the location indicated by the arrow $P_{1,2}$, the products are transferred from the first conveying surface of the first conveyor belt 7 to the second conveying surface of the second conveyor belt 8, preferably by means of a guide member 11 (see FIG. 3).

Figure 3:
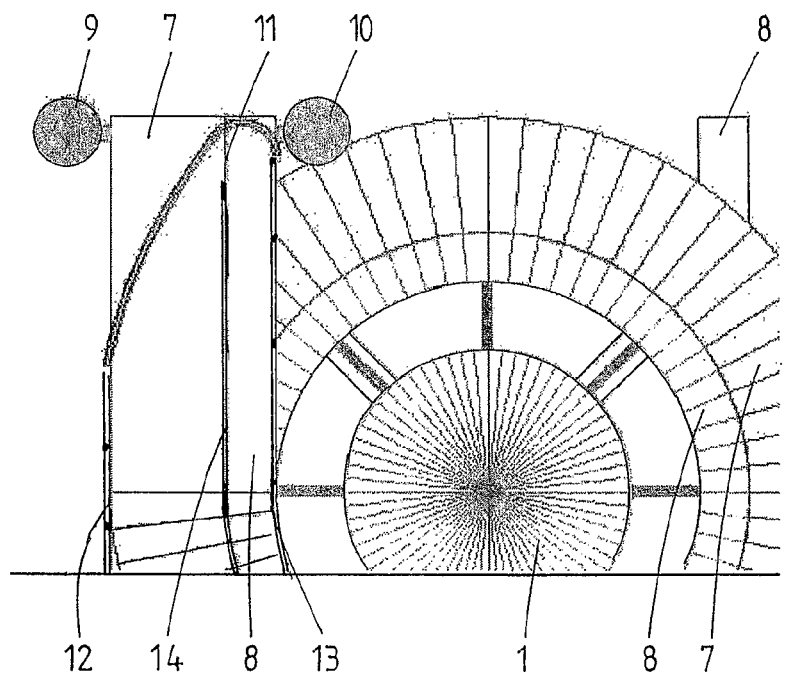
FIG. 3 is a partial top plan view comparable to FIG. 2 of a device, also showing the guide member.

As FIG. 3 further schematically shows, guides 12, 13 are arranged on either side of the guide chute 3, whilst the first conveyor belt 7 and the second conveyor belt 8 are separated by an intermediate guide 14. The intermediate guide 14 extends upwards to a position in which it is spaced from the guide member 11 by some distance, which distance is just sufficiently large for allowing a product to pass from the first conveyor belt 7 to the second conveyor belt 8. The intermediate guide 14 and/or the guide member 11 may be adjustable in longitudinal direction so as to be able to buffer different kinds of products. The guides 12-14 may also be adjustable for correctly guiding products having different diameters.

The guide member 11 that is provided near the upper end of the first conveyor belt 7 may be stationary and consequently guide the products only passively from the first conveyor belt 7 to the second conveyor belt 8. On the other hand, the guide member 11 may be driveable, i.e. movable so as to guide the products in a more active manner. Such a movement may be a circulating movement in the direction of the first conveyor belt 7 to the second conveyor belt 8. For example, a belt guided by rollers may be arranged around the guide member 11. On the other hand, said movement may also be an oscillating movement in the plane of the conveyor belt 7, so as to prevent local blockages and thus aid the flow of products.

In the illustrated example, the first conveyor belt 7 has a greater width than the second conveyor belt 8, and preferably the width of the second conveyor belt 8 is such that the buffered products can only be transported one behind another over the second conveyor belt 8. In that case, the products can be evenly supplied one by one to a treatment location downstream of the device. In the illustrated case, the width of the first conveyor belt 7 is such that a number of products, e.g. four to ten products, five in the illustrated embodiment, can be present beside each other on the conveying surface of the conveyor belt 7. In this way, the first conveyor belt 7 has a conveying surface with a large area, and a large buffering capacity can be obtained because the device can accommodate a large number of products. The guides 12-14 may be adjustable so as to make it possible to adapt the device to the dimensions of the products.

Several embodiments of the first conveyor belt 7 are possible, as long as a preferably more or less closed surface having a sufficiently low friction is obtained. Examples of such conveyor belts are lamella belts, link belts, stainless steel lamella chains, textile belts, PVC belts, stainless steel belts and the like, which latter belt types are generally only suitable for use in a straight, i.e. non-curved conveying path. The invention also extends to devices comprising straight conveying paths, however.

The construction of the second conveyor belt 8 may vary, depending on the kind of products and the requirements made of the discharge and the further transportation of the products (see the arrow D). In principle, a "wedge conveyor" or a "side grip conveyor" might be used, whilst also the path of the second conveyor belt 8 may be completely different from the illustrated path. Furthermore, the second conveyor belt need not extend downwards.

In practice, the angle at which the conveying surface of the first conveyor belt 7 is disposed is generally 2-10°, in particular 3-6°, preferably 4-4.5°. This angle of inclination must be geared to the expected coefficient of friction between the conveying surface of the first conveyor belt 7 and the products being transported. After all, according to the invention, the dragging force being exerted on the products from the conveying surface of the first conveyor belt 7 is intended to be greater than the force of gravity being exerted on the products in the direction along the conveying surface of the first conveyor belt 7. In the case of a fixed angle of inclination, this can be achieved by a suitable selection of the conveyor belt or by influencing the coefficient of friction, which is done by lubricating the conveying surface of the first conveyor belt 7. The coefficient of friction between the conveying surface and the product to be buffered may be 0.14-0.16, for example. Thus, the products to be buffered are only just carried upwards on the conveying surface, and the products are prevented from exerting too much pressure on each other as soon as said products accumulate at the end of the first conveying surface of the conveyor belt 7. Consequently, there is only a small chance of the products being damaged as a result of said pressure, whilst in addition said pressure will not lead to the products getting wedged upon being transferred to the second conveyor belt 8. Especially in the case of cylindrical products this risk will be very small.

Figure 4:
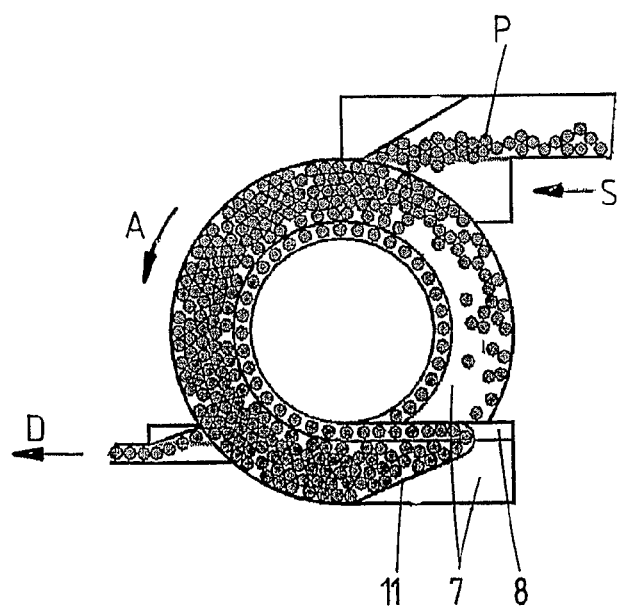
FIG. 4 is a schematic top plan view of a device during operation, which illustrates the buffering method according to the invention.

FIG. 4 shows an embodiment of the method according to the invention. Arrow S indicates a supply conveyor 15, at which products P are supplied from a processing location and the guided onto the conveyor belt 7. The conveying surface of the first conveyor belt 7 moves in the direction indicated by the arrow A, at a rate that ensures a correct transfer of the products P from the supply conveyor S and a sufficient flow of products. The products P that are being supplied are carried along at a random location on the conveying surface of the first conveyor belt 7 towards the upper end thereof. Depending on the rate at which the second conveyor belt 8 takes over products, a number of products will accumulate, i.e. come to a virtual standstill, near the upper end of the first conveyor belt 7. Due to the low amount of friction and the low dragging force being exerted on the bottom of the products P by the conveying surface, the pushing force that is exerted on the accumulated products will only be low.

A guide member 11 is provided near the upper end of the first conveyor belt 7, by means of which products P are transferred one by one from the first conveyor belt 7 to the second conveyor belt 8. Said transfer takes place as a result of the pressure being exerted on the products P and the preceding product P being discharged by the second conveyor belt 8. The guide member 11 may be driven so as to assist in the transfer of the products P. Depending on the difference between the amount of products being supplied at S and the amount of products being discharged at D, a larger or smaller amount of products P will accumulate on the conveying surface of the first conveyor belt 7, so that a larger or a smaller part of the conveying surface will be occupied by the products.

It will be apparent from the foregoing that the invention provides a simple method and device for accumulating products.

The invention is not limited to the embodiments as described above and illustrated in the drawings, which can be varied in several ways within the scope of the invention. Thus, the guide member need not be disposed near the upper end of the first conveyor belt. Furthermore, it is possible for the guides present on either side of the first conveyor belt to move along with said conveyor belt. No intermediate guide must be present at the transfer location between the first and the second conveyor belt, however, or the intermediate guide must be present below the surface of the conveyor belts. The second conveyor belt may extend along a path completely different from that of the first conveyor belt. Thus the second belt may extend in the same direction as the first belt, with a guide member preferably guiding the products laterally from the first conveyor belt to the second conveyor belt. Furthermore, the first and/or the second conveyor belt may be built up of several narrow belts arranged side by side. Said belts may be driven at slightly different speeds, but preferably in the same direction and synchronously in relation to each other. Such a driving technique makes it possible to prevent or, on the contrary, stimulate a lateral flow of products on the conveyor belts, depending on the application in question. Both the first and the second conveyor belt may be suitable for conveying one or more products beside each other. The two conveyors may be driven in different ways. Independent drive units and electronically or mechanically coupled drive units may be used.

The invention claimed is:

1. A method of buffering products, in particular substantially cylindrical containers, said method comprising
    carrying the products upwards on a moving, inclined first conveying surface at a first flow rate towards a guide member for transferring the products from the first conveying surface to a second conveying surface, the guide member being disposed adjacent an upper end of the first conveying surface, such that the products on the first conveying surface can be stopped by and accumulate against the guide member, and
    guiding the products from the guide member onto the second conveying surface, and conveying the products onwards on the second conveying surface at a second flow rate, the second flow rate being different from the first flow rate,
    wherein in said carrying of the products upward on the first conveying surface, the first conveying surface is inclined at an angle and is provided with a surface condition such that the dragging force exerted on the products from the first conveying surface is greater than the force of gravity being exerted on the products in a direction along the first conveying surface, so as to allow the products to move relative to the first conveying surface as the first conveying surface carries the products upwards.

2. The method according to claim 1, wherein several of the products are transported beside each other on the first conveying surface, whilst the products are transported one behind another on the second conveying surface.

3. The method according to claim 1, wherein said guiding comprises changing the direction of the products at the guide member, such that the products are transported in opposite directions over at least part of their conveying path on the first and the second conveying surfaces.

4. A device for buffering products, in particular substantially cylindrical containers, such as bottles, cans and pots, said device comprising
    a drivable, inclined first conveying surface for carrying the products upwards at a first flow rate, the first conveying surface having an upper end,
    a drivable second conveying surface for transporting the products,
    a guide member for stopping the products on the first conveying surface and for transferring the products from the first conveying surface to the second conveying surface, so that the products can accumulate against the guide member and be guided from the guide member onto the second conveying surface, said guide member being positioned at the upper end of the first conveying surface, and
    the second conveying surface being configured for transporting the products onwards from said guide member,
    wherein said first conveying surface is inclined at an angle and has a surface condition such that the dragging force exerted on the products from said first conveying surface is greater than the force of gravity exerted on the products in a direction along said first conveying surface, so as to allow the products to move relative to the said first conveying surface as said first conveying surfaces carries the products upwards.

5. The device according to claim 4, wherein said first and second conveying surfaces each have a width, and the width of said first conveying surface is greater than the width of said second conveying surface, and wherein said conveying surfaces are laterally bounded by guides.

6. The device according to claim 4, wherein said guide member is arranged at an angle with respect to said first conveying surface for deflecting and or reversing the products.

7. The device according to claim 6, wherein said first and second conveying surfaces are formed on endless conveying elements that are driven in opposite directions, said conveying elements having at least partially identical helical paths.

8. The device according to claim 4, wherein said guide member can be driven to guide the products toward said second conveying surface.

9. The device according to claim 4, further comprising a lubricating device for lubricating said first conveying surface.

10. The device according to claim 4, wherein said first conveying surface is inclined at an angle in a range of 3° to 6°, and the coefficient of friction between said first conveying surface and the products is in a range of 0.14-0.16.

11. A product treatment line comprising
    a supply conveyor,
    a discharge conveyor, and
    a device for buffering products, said device for buffering products comprising
    a drivable, inclined first conveying surface for carrying the products upwards at a first flow rate and having an upper end,
    a drivable second conveying surface for transporting the products,
    a guide member for stopping the products on the first conveying surface and for transferring the products from the first conveying surface to the second conveying surface, so that the products can accumulate against the guide member and be guided from the guide member onto the second conveying surface, said guide member being positioned at said upper end of said first conveying surface, and the second conveying surface being configured for transporting the products onwards from said guide member, wherein said first conveying surface is inclined at an angle and has a surface condition such that the dragging force exerted on the products from said first conveying surface is greater than the force of gravity exerted on the products in a direction along said first conveying surface, so as to allow the products to move relative to said first conveying surface as said first conveying surface carries the products upwards.

12. The method according to claim 2, wherein said guiding comprises changing the direction of the products at the guide member, such that the products are transported in opposite directions over at least part of their conveying path on the first and the second conveying surfaces.

13. The device according to claim 5, wherein said guide member is arranged at an angle with respect to said first conveying surface, for deflecting or reversing the products.

14. The device according to claim 13, wherein said first and second conveying surfaces are formed on endless conveying elements that are driven in opposite directions, said conveying elements having at least partially identical helical paths.

15. The device according to claim 5, wherein said guide member can be driven to guide the products toward said second conveying surface.

16. The device according to claim 6, wherein said guide member can be driven to guide the products toward said second conveying surface.

17. The device according to claim 13, wherein said guide member can be driven to guide the products toward said second conveying surface.

18. The device according to claim 7, wherein said guide member can be driven to guide the products toward said second conveying surface.

19. The device according to claim 14, wherein said guide member can be driven to guide the products toward said second conveying surface.

20. The device according to claim 5, further comprising a lubricating device for lubricating said first conveying surface.

21. The method of buffering products according to claim 1, wherein in said carrying of the products upwards on the first conveying surface, the first conveying surface is inclined at an angle in a range of 3° to 6°, and the coefficient of friction between the first conveying surface and the products is in a range of 0.14-0.16.

22. The product treatment line according to claim 11, wherein said first conveying surface is inclined at an angle in a range of 3° to 6°, and the coefficient of friction between said first conveying surface and the products is in a range of 0.14-0.16.

* * * * *